United States Patent
Kopp

(10) Patent No.: US 7,489,128 B2
(45) Date of Patent: Feb. 10, 2009

(54) MRI PROTECTOR

(76) Inventor: Keith A. Kopp, 2039 NE. Ginger Ter., Jensen Beach, FL (US) 34957

( * ) Notice: Subject to any disclaimer, the term of this patent is extended or adjusted under 35 U.S.C. 154(b) by 978 days.

(21) Appl. No.: 10/095,543

(22) Filed: Mar. 11, 2002

(65) Prior Publication Data

US 2003/0171669 A1 Sep. 11, 2003

(51) Int. Cl.
*G01N 27/72* (2006.01)
(52) U.S. Cl. ............... 324/227; 600/407; 600/409; 600/410; 324/244; 324/260; 324/261; 324/243; 324/242
(58) Field of Classification Search ......... 600/407–410; 324/260, 261, 227, 244
See application file for complete search history.

(56) References Cited

U.S. PATENT DOCUMENTS

| | | | |
|---|---|---|---|
| 3,573,817 A | 4/1971 | Akers | |
| 3,665,449 A | 5/1972 | Elder et al. | |
| 3,725,888 A | 4/1973 | Solomon | |
| 3,971,983 A * | 7/1976 | Jaquet | ............. 324/227 |
| 4,326,198 A | 4/1982 | Novikoff | |
| 4,413,254 A | 11/1983 | Pinneo et al. | |
| 4,595,915 A | 6/1986 | Close | |
| 4,888,579 A | 12/1989 | ReMine et al. | |
| 4,990,850 A | 2/1991 | Votruba | |
| 5,444,966 A | 8/1995 | Strosser et al. | |
| 5,726,628 A | 3/1998 | Yoo | |
| 5,790,685 A | 8/1998 | Sallee | |
| 6,133,829 A | 10/2000 | Johnstone et al. | |
| 6,150,810 A * | 11/2000 | Roybal | ............. 324/244 |
| 6,307,473 B1 | 10/2001 | Zampini et al. | |
| 6,308,644 B1 | 10/2001 | Diaz | |
| 6,819,241 B2 | 11/2004 | Turner et al. | |
| 7,113,092 B2 | 9/2006 | Keene | |
| 2003/0171609 A1 | 9/2003 | Ionkin | |
| 2004/0147833 A1 | 7/2004 | Czipott et al. | |
| 2004/0147834 A1 | 7/2004 | Czipott et al. | |
| 2004/0169509 A1 | 9/2004 | Czipott et al. | |
| 2004/0189293 A1 | 9/2004 | Czipott et al. | |

FOREIGN PATENT DOCUMENTS

| | | | |
|---|---|---|---|
| EP | 0353035 | | 1/1990 |
| EP | 0831339 | | 9/1997 |
| JP | 01223949 A | * | 9/1989 |
| WO | 9636873 | | 11/1996 |

* cited by examiner

*Primary Examiner*—Brian L. Casler
*Assistant Examiner*—John F Ramirez
(74) *Attorney, Agent, or Firm*—Pearne & Gordon LLP

(57) ABSTRACT

An MRI protector for protecting personnel and the MRI apparatus from the introduction of ferrous articles into the magnetic field of the MRI has an array of Hall effect sensors oriented to scan the magnetic field of the MRI. The Hall effect sensors are oriented to scan the magnetic field at the access door of the shielded MRI room. The sensors are connected to a central processing unit (CPU) which analyses the output of the sensors and propagates a warning when the presence of ferrous articles affects the magnetic field of the MRI.

20 Claims, 1 Drawing Sheet

MRI PROTECTOR

FIELD OF THE INVENTION

This invention relates to the field of medical diagnostics and, specifically, to protection of personnel and equipment involved in MRI diagnosis.

BACKGROUND OF THE INVENTION

The use of magnetic resonance imaging (MRI) as a diagnostic tool is a fairly recent innovation in the medical field. This new apparatus allows a detailed view of the bone and tissue inside the body of a patient. The diagnostic device has become an invaluable tool for imaging and exploring the internal body without surgery. MRI has the ability to distinguish healthy and diseased tissue, fat and muscle, and between adjacent structures within the body which other modalities cannot demonstrate. MRI utilizes safe radio waves and a magnetic field to generate the images processed by a computer.

In operation, a typical MRI apparatus relies upon hydrogen protons which have a dipole movement and therefore behave as would a magnetic compass. In MRI scanning, the MRI apparatus operates as a large magnet wherein the protons align with the strong magnetic field but are easily disturbed by a brief radio frequency pulse of very low energy so as to alter their alignment. As the protons return to their orientation with the magnetic field, they release energy of a radio frequency that is strongly influenced by the biochemical environment. The released energy as detected and mathematically analyzed for display as a two dimensional proton density image according to the signal intensity of each tissue.

As with any new equipment, there is a learning curve for the personnel using the device. Partly because of the expense of the apparatus, most MRI machines are in hospitals or other large facilities which have other employees in addition to those especially trained to use the machines. These other employees also must have some training in the operation of the devices and, especially, any potential dangers associated with the use of the apparatus.

The potential dangers associated with MRI machines include the presence, within the apparatus and surrounding area, of a strong magnetic field. Also, there is the presence of a vacuum vessel, within the apparatus, housing super cooled liquified gas. On the one hand, the magnetic force may convert loose metal objects into unguided missiles directed at the MRI apparatus and, on the other hand, puncture of the vacuum vessel would be catastrophic. There have been reports of injuries and at least one fatality involving iron, steel and other metal objects striking personnel within the vicinity of an MRI apparatus. These objects have been unwittingly introduced into the magnetic field of the MRI.

Usually, the MRI device is located within a shielded room for improved results and also to lessen the impact of the device on surrounding operations. However, the problem persists of metal objects being negligently introduced into the magnetic field by personnel entering the room or the extended magnetic field of the MRI apparatus.

DESCRIPTION OF THE PRIOR ART

Metal detectors usually used to detect magnetizable metal objects, both ferrous and other metals, such as hand held wands, use battery powered active pulsing electric coils and measure the change in the inductance in the coil. These devices are commonly used to search people for metal objects and to search for buried metal objects, such as mines or treasure. The operation of the coils can interfere with the imaging of the MRI apparatus.

The Hall effect sensors are passive detectors which monitor an established magnetic field and detect changes in the magnetic field produced by introduction of a ferrous object into the field.

U.S. Pat. No. 5,444,966 issued Aug. 29, 1995 to Strosser et al discloses a ferrous metal detector for use in a harvester to protect the internal mechanism from ferrous objects ingested by the machine. The metal detector includes both Hall effect sensors and permanent magnets. The magnets are necessary to establish the magnetic field monitored by the sensors. The magnets and the sensors are specifically oriented in regard to each other for maximum coverage and sensitivity.

U.S. Pat. No. 4,990,850 issued Feb. 5, 1991 to Votruba discloses a device to scan patients before nuclear magnetic resonance (NMR) procedures to determine if ferrous objects are present in or on the patient. The device includes both magnets and Hall effect sensors to monitor the magnetic field. The signal of the sensors varies as the magnetic field changes with the introduction of a, ferrous object into the field.

What is needed in the art is a simple array of Hall effect sensors, without associated magnets, to generate an alarm when ferrous objects enter the magnetic field of an MRI apparatus.

SUMMARY OF THE INVENTION

Disclosed is an apparatus for protecting personnel and the MRI apparatus from the introduction of ferrous articles into the magnetic field of the MRI unit. The apparatus employs an array of Hall effect sensors oriented to utilize the fringe magnetic field of the MRI. The sensors are connected to a central processing unit (CPU) which analyses the output of the sensors and propagates a warning when the presence of ferrous articles affects the magnetic field of the MRI.

Accordingly, it is an objective of the instant invention to prevent the introduction of ferrous objects into the magnetic field of an MRI apparatus where their uncontrolled movement may become a danger to personnel and the MRI apparatus.

It is a further objective of the instant invention to teach the use of the magnetic field of the MRI apparatus, itself, to detect ferrous objects by an array of Hall effect sensors connected to a central processing unit, including a pre-amp and signal processor, to generate an alarm when a ferrous object impinges on the magnetic field of an MRI apparatus. In this way the MRI apparatus inherently protects itself.

It is a another objective of the instant invention to teach the deployment of the array of Hall effect sensors to scan the residual magnetic field that exists in the vicinity of an MRI apparatus and recognize the characteristic signature of ferrous intrusions.

It is yet another objective of the instant invention to teach the placement of the array of Hall effect sensors at the access door to the room housing the MRI apparatus.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
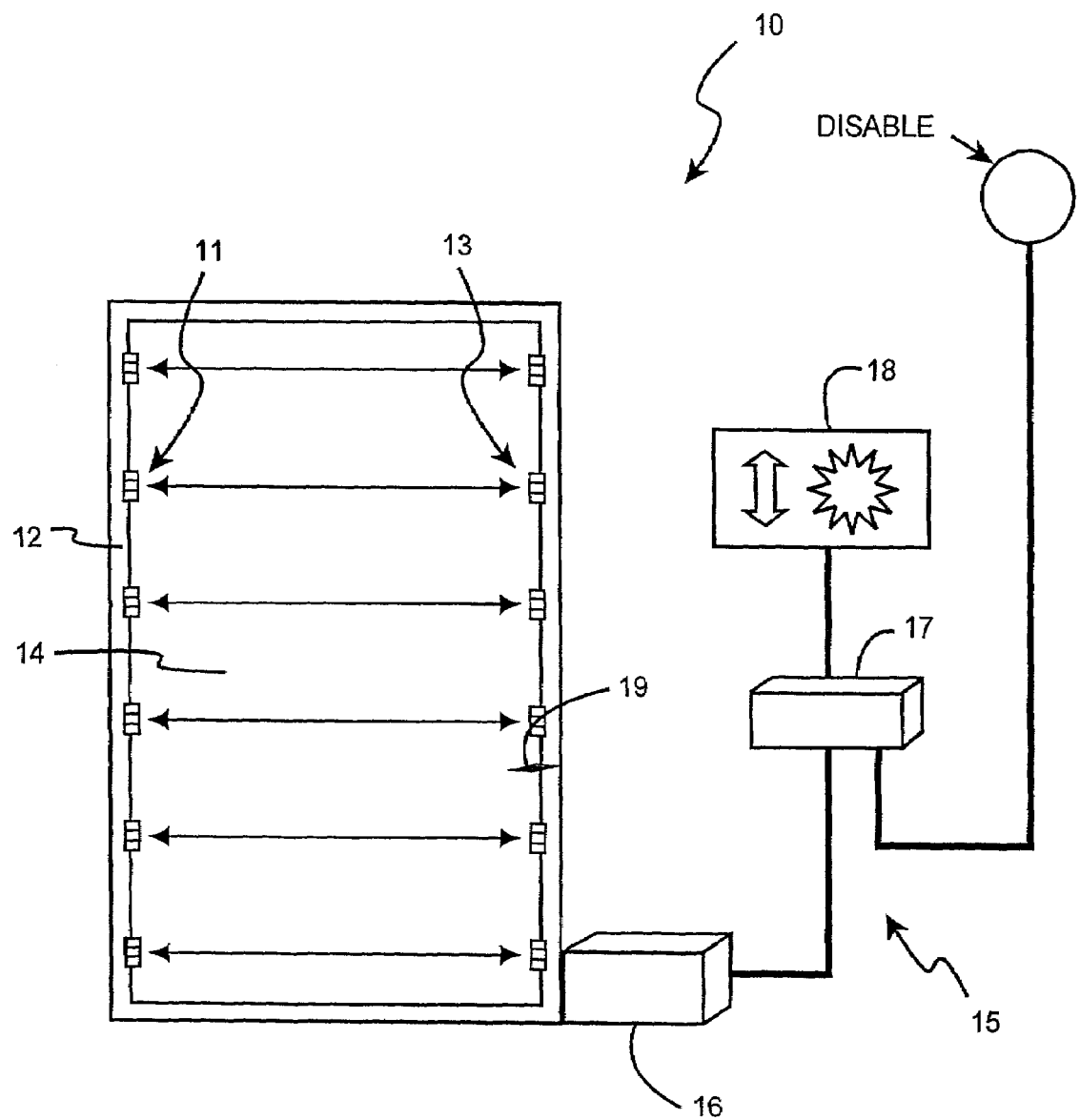
FIG. 1 is a diagrammatic representation of the detector of this invention.

The ferrous detector 10 includes an array of Hall effect sensors located near the access doorway 12 of the shielded room housing the MRI apparatus (not shown). The array may be mounted on the doorway 12 or they may be carried by vertical arms of a mobile cart (not shown). The array has a series of sensors 11 and 13 on each side of the doorway oriented to horizontally scan the vertical plane of the opening. Each of the sensors in the series of sensors 11 and 13 are connected to an electronic central processing unit (CPU), generally designated 15, which receives the output of the sensors.

The residual lines of magnetic force of the magnet in the MRI apparatus pass through the access opening 14 generally normal to the scan of the Hall effect sensors. The passive sensors in the series 11 and 13 are sensitive to the magnetic force lines along one axis and produce a signal related to magnetic field strength. As a ferrous object (not shown) approaches the access doorway 12, the residual magnetic field is disrupted. The output of some or all of the Hall effect sensors of the series of sensors 11 and 13 changes in response to the change in the magnetic field depending on the size, spatial location, and speed of the ferrous object.

The CPU 15 includes a pre-amp/pre-processor 16 connected to the sensors of the series of Hall effect sensors 11 and 13. The pre-amp/pre-processor 16 eliminates interference and establishes a usable signal which is amplified into a stabilized signals from the sensors to the signal processor and alarm generator 17. The signals processor/alarm generator 17 analyses the incoming signals from the pre-amp and determines, based on programmed parameters, whether or not to generate an alarm. For example, the analysis may include: a band pass filter to allow signals to be analyzed over time to determine speed of approach with upper and lower limits set to prevent generation of an alarm, or if all sensors are affected equally, no alarm is generated. The signals may be analyzed over time to determine speed of approach with upper and lower limits to prevent generation of an alarm.

The alarm may be aural or visual or both. The alarm may include activation of other mechanical devices to protect the immediate area of the MRI apparatus.

The alarm may be located within the MRI room or in the approach hall thereto. Of course, the signal processor may be operatively connected to the door of the MRI room, as a kicker to close the door or to the door lock (not shown), or other safety devices. The CPU has a display and alarm panel 18 which may be located with the CPU or at a remote location, or both, that may be visible to personnel inside or outside the MRI room.

The detector 10 includes a door position sensor 19 connected to the CPU and the doorway 12. The sensor 19 disables the detector 10 when the door is closed. Of course, the sensor 19 could be attached to the door (not shown).

An additional function of the CPU is a disable command to the Hall effect sensors based on the output trigger signal of the MRI scanner.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A protection arrangement for association with an operable MRI apparatus located within a room that has an access opening, the MRI apparatus providing a residual magnetic field that extends to a location of the opening, the arrangement including:

a detector for passively monitoring the residual magnetic field at the location of the opening, the detector includes an array of passive magnetic field sensors arranged about the periphery of the opening in a spaced arrangement such that each sensor is associated with a different portion of the access opening, the field changing in response to a presence of ferrous material at the opening, each of the sensors including means for outputting a signal indicative of the ferrous material responsive change in the magnetic field at the associated portion of the access opening; and means for receiving the change indicative signals, for determining whether the change indicated by at least one of the change indicative signals exceeds a limit and for providing a safety response that addresses the condition of ferrous material at the opening of the room within which the MRI apparatus is located upon determination of at least one threshold being exceeded.

2. An arrangement as set forth in claim 1, wherein the passive magnetic field sensors are independent Hall effect sensors that are each subjected a different portion of the magnetic field, with each different portion of the magnetic field permeating the respective associated portions of the access opening.

3. An arrangement as set forth in claim 1, wherein the array of passive magnetic field sensors is arranged to have multiple sensor pairs, with each pair being a location along a dimension of the opening and having one sensor located at one side of the opening and another sensor located at another side of the opening, with one of the sensors of each pair associated with a portion of the access opening at the respective location along the dimension of the opening and on the one respective side of the opening and the other of the sensors of each pair associated with a portion of the access opening at the respective location along the dimension of the opening and on the other, respective side of the opening.

4. An arrangement as set forth in claim 1, wherein the means for receiving the change indicative signals, for determining whether the change indicated by at least one of the change indicative signals exceeds a threshold and for providing a safety response includes means for providing a warning alarm.

5. An arrangement as set forth in claim 4, wherein the means for providing a warning alarm includes means for providing an audible alarm.

6. An arrangement as set forth in claim 4, wherein the means for providing a warning alarm includes means for providing a visual alarm.

7. An arrangement as set forth in claim 6, wherein the means for providing a visual alarm includes a visual warning device located inside the room.

8. An arrangement as set forth in claim 6, wherein the means for providing a visual alarm includes a visual warning device located outside of the room.

9. An arrangement as set forth in claim 4, wherein the means for receiving the change indicative signals, for determining whether the change indicated by at least one of the change indicative signals exceeds a threshold and for providing a safety response includes means for disabling operation of the MRI apparatus.

10. An arrangement as set forth in claim 1, wherein the means for receiving the change indicative signals, for determining whether the change indicated by at least one of the change indicative signals exceeds a threshold and for providing a safety response includes means for disabling operation of the MRI apparatus.

11. An arrangement as set forth in claim 1, wherein the means for receiving the change indicative signals, for determining whether the change indicated by at least one of the change indicative signals exceeds a threshold and for providing a safety response includes means for analyzing the change indicative signal and means for determining whether to provide the safety response based upon the analysis.

12. An arrangement as set forth in claim 1, wherein the access opening is a doorway through a wall that bounds the room, the detector being mounted at the doorway through the wall.

13. An arrangement as set forth in claim 1, wherein the access opening is a doorway through a wall that bounds the room, the arrangement includes a means to sense a closure position of a door associated with the doorway and means to deactivate the detector in response to a sensed door closed condition.

14. An arrangement as set forth in claim 1, wherein the sensors are arranged such that each sensor is affected by the residual magnetic field independently of the other sensors and the means for receiving the change indicative signals, for determining whether the change indicated by at least one of the change indicative signals exceeds a threshold and for providing a safety response processes each received change indicative signal separately to determine the associated change exceeds the respective threshold.

15. A protection arrangement for association with an operable MRI apparatus located within a room that has an access opening, the MRI apparatus providing a residual magnetic field that extends to a location of the opening, the arrangement including:

an array of passive magnetic field sensors, mounted about the periphery of the opening in a spaced arrangement such that each sensor is associated with a different portion of the access opening, each sensor for monitoring the residual magnetic field at the associated portion of the access opening, the field changing in response to a presence of ferrous material at the opening, the array of passive magnetic field sensors provides signals indicative of the ferrous material responsive change in the magnetic field; and a signal processor/safety response generator receives the change indicative signals, determines whether the change indicated by at least one of the change indicative signals exceeds a limit and indicates a need for a safety response, and provides a safety response that addresses the condition of ferrous material at the opening of the room within which the MRI apparatus is located.

16. An arrangement as set forth in claim 15, wherein the array of passive magnetic field sensors includes multiple pairs of Hall effect sensors, with each pair being a location along a dimension of the opening and having one sensor located at one side of the opening and another sensor located at another side of the opening, with one of the sensors of each pair associated with a portion of the access opening at the respective location along the dimension of the opening and on the one respective side of the opening and the other of the sensors of each pair associated with a portion of the access opening at the respective location along the dimension of the opening and on the other, respective side of the opening.

17. An arrangement as set forth in claim 15, wherein the signal processor/safety response generator includes an audible alarm device, a visual alarm device located outside of the room, and a device that disables operation of the MRI apparatus.

18. An arrangement as set forth in claim 15, wherein the access opening is a doorway through a wall that bounds the room,-the arrangement includes a means to sense a closure position of a door associated with the doorway and means to deactivate the detector in response to a sensed door closed condition.

19. An arrangement as set forth in claim 15, wherein the signal processor/safety response generator includes a visual alarm device located outside of the room.

20. An arrangement as set forth in claim 15, wherein the signal processor/safety response generator includes a device that disables operation of the MRI apparatus.

* * * * *

UNITED STATES PATENT AND TRADEMARK OFFICE
CERTIFICATE OF CORRECTION

| | | |
|---|---|---|
| PATENT NO. | : 7,489,128 B2 | Page 1 of 1 |
| APPLICATION NO. | : 10/095543 | |
| DATED | : February 10, 2009 | |
| INVENTOR(S) | : Kopp | |

It is certified that error appears in the above-identified patent and that said Letters Patent is hereby corrected as shown below:

Col. 2 line 24, please delete "a," and insert therefore --a--.

Signed and Sealed this
Twenty-ninth Day of March, 2011

David J. Kappos
*Director of the United States Patent and Trademark Office*